US012645881B2

(12) United States Patent
Qiu et al.

(10) Patent No.: US 12,645,881 B2
(45) Date of Patent: Jun. 2, 2026

(54) NESTED NAMED ENTITY RECOGNITION METHOD BASED ON PART-OF-SPEECH AWARENESS, DEVICE AND STORAGE MEDIUM THEREFOR

(71) Applicant: Guangzhou University, Guangzhou (CN)

(72) Inventors: Jing Qiu, Guangzhou (CN); Ling Zhou, Guangzhou (CN); Chengliang Gao, Guangzhou (CN); Rongrong Chen, Guangzhou (CN); Ximing Chen, Guangzhou (CN); Zhihong Tian, Guangzhou (CN); Lihua Yin, Guangzhou (CN); Hui Lu, Guangzhou (CN); Yanbin Sun, Guangzhou (CN); Junjun Chen, Guangzhou (CN); Dongyang Zheng, Guangzhou (CN); Fei Tang, Guangzhou (CN); Jiaxu Xing, Guangzhou (CN)

(73) Assignee: Guangzhou University, Guangzhou (CN)

( * ) Notice: Subject to any disclaimer, the term of this patent is extended or adjusted under 35 U.S.C. 154(b) by 240 days.

(21) Appl. No.: 18/520,629

(22) Filed: Nov. 28, 2023

(65) Prior Publication Data
US 2024/0111956 A1    Apr. 4, 2024

Related U.S. Application Data

(63) Continuation-in-part of application No. PCT/CN2022/133113, filed on Nov. 21, 2022.

(30) Foreign Application Priority Data

Dec. 13, 2021    (CN) .......................... 202111518808.5

(51) Int. Cl.
| | |
|---|---|
| *G06F 40/295* | (2020.01) |
| *G06F 40/253* | (2020.01) |
| *G06F 40/284* | (2020.01) |

(52) U.S. Cl.
CPC .......... *G06F 40/295* (2020.01); *G06F 40/253* (2020.01); *G06F 40/284* (2020.01)

(58) Field of Classification Search
CPC ..... G06F 40/295; G06F 40/253; G06F 40/284
See application file for complete search history.

(56) References Cited

U.S. PATENT DOCUMENTS

2022/0245347 A1*    8/2022    Wang ................... G06V 30/416

FOREIGN PATENT DOCUMENTS

| | | | | |
|---|---|---|---|---|
| CN | 112084335 A | * 12/2020 | ......... | G06F 18/2415 |
| CN | 113688631 A | 11/2021 | | |

OTHER PUBLICATIONS

Z. Kang, Y. Liu, G. Bi, F. Fang and P. Yin, "No news is an island: Joint heterogeneous graph network for news classification," 2021 IEEE Symposium on Computers and Communications (ISCC), Athens, Greece, 2021, pp. 1-7 (Year: 2021).*

(Continued)

*Primary Examiner* — Bhavesh M Mehta
*Assistant Examiner* — Joseph J. Yamamoto

(57) ABSTRACT

Disclosed are a Nested Named Entity Recognition method based on part-of-speech awareness, system, device and storage medium therefor. The method uses a BiLSTM model to extract a feature of text word data in order to obtain a text word depth feature, and each text word of text to be recognized is initialized into a corresponding graph node, and a text heterogeneous graph of the text to be recognized is constructed according to a preset part-of-speech path, the text word data of the graph nodes is updated by an attention mechanism, and the features of all graph nodes of the text (Continued)

heterogeneous graph are extracted using the BiLSTM model, and a nested named entity recognition result is obtained after decoding and annotating. The present disclosure can recognize ordinary entities and nested entities accurately and effectively, and enhance the performance and advantages of the nested named entity recognition model.

17 Claims, 11 Drawing Sheets

(56)                    References Cited

OTHER PUBLICATIONS

Jana StrakovÃ;, Milan Straka, and Jan Hajic. 2019. Neural Architectures for Nested NER through Linearization. In Proceedings of the 57th Annual Meeting of the Association for Computational Linguistics, pp. 5326â5331, Florence, Italy. Association for Computational Linguistic (Year: 2019).*
Chen, Pei, et al. "Explicitly capturing relations between entity mentions via graph neural networks for domain-specific named entity recognition." Proceedings of the 59th Annual Meeting of the Association for Computational Linguistics (Year: 2022).*
Ying Luo et al., Bipartite Flat-Graph Network for Nested Named Entity Recognition, arXiv:2005.00436v1, May 1, 2020, pp. 1-11.

* cited by examiner

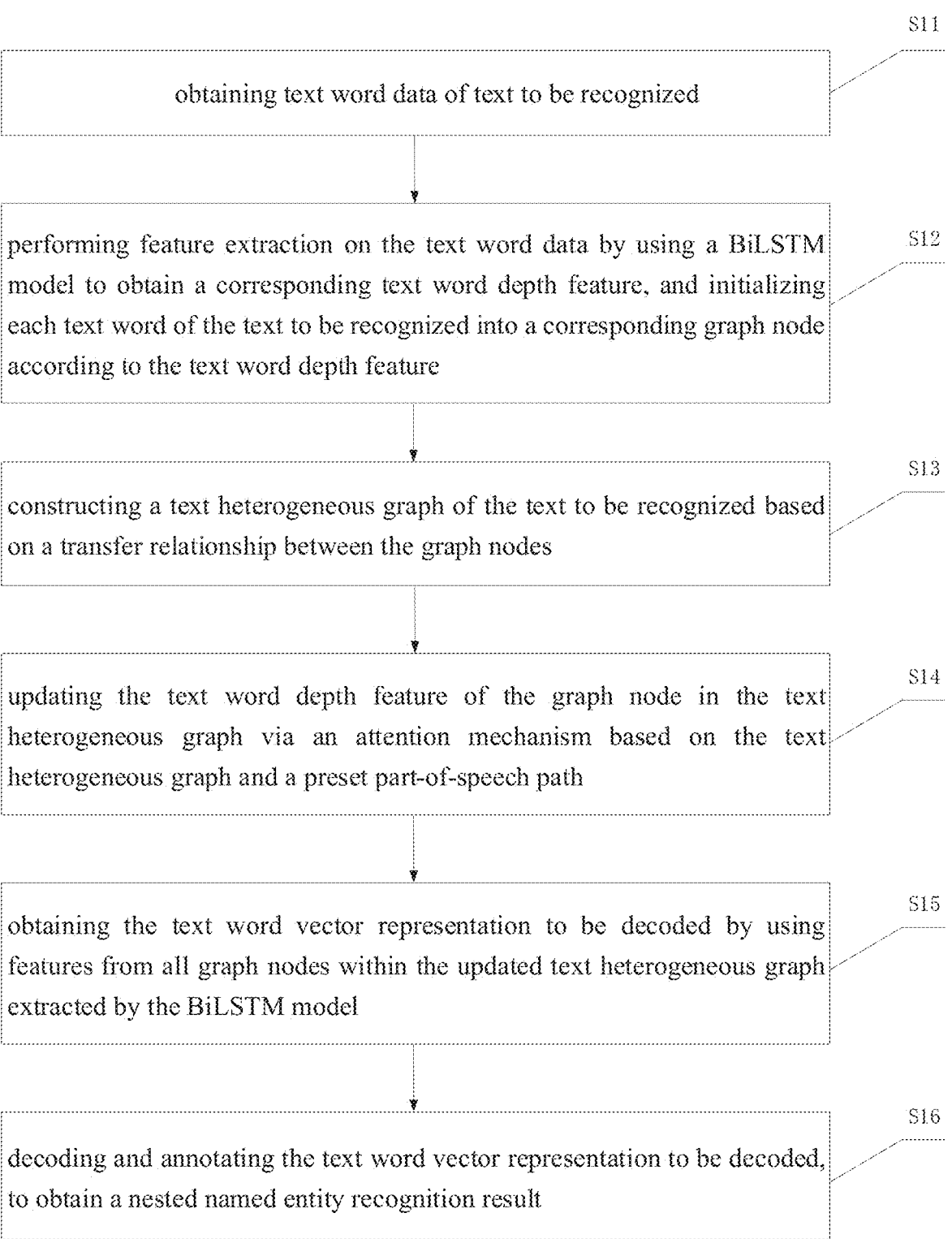

S11 obtaining text word data of text to be recognized

S12 performing feature extraction on the text word data by using a BiLSTM model to obtain a corresponding text word depth feature, and initializing each text word of the text to be recognized into a corresponding graph node according to the text word depth feature

S13 constructing a text heterogeneous graph of the text to be recognized based on a transfer relationship between the graph nodes

S14 updating the text word depth feature of the graph node in the text heterogeneous graph via an attention mechanism based on the text heterogeneous graph and a preset part-of-speech path

S15 obtaining the text word vector representation to be decoded by using features from all graph nodes within the updated text heterogeneous graph extracted by the BiLSTM model

S16 decoding and annotating the text word vector representation to be decoded, to obtain a nested named entity recognition result

Figure 3 word id: 0123405678

Performance of different sampling algorithms on GENIA

The influence of the number of neighbor nodes on model performance and time cost

NESTED NAMED ENTITY RECOGNITION METHOD BASED ON PART-OF-SPEECH AWARENESS, DEVICE AND STORAGE MEDIUM THEREFOR

CROSS REFERENCE TO RELATED APPLICATIONS

The present application is a Continuation-In-Part Application of PCT Application No. PCT/CN2022/133113 filed on Nov. 21, 2022, which claims the benefit of Chinese Patent Application No. 202111518808.5 filed on Dec. 13, 2021. All the above are hereby incorporated by reference in their entirety.

TECHNICAL FIELD

The present disclosure relates to the technical field of natural language processing and construction of knowledge graph, and in particular, to a Nested Named Entity Recognition method based on part-of-speech awareness, device and storage medium therefor.

BACKGROUND

Named Entity Recognition (NER) is one of the basic tasks in the process of constructing knowledge graphs in the field of natural language processing. NER is mainly used to extract entities with specific meaning that constitute the knowledge graphs, and also serves as an important basic tool for information extraction, question answering system, syntactic analysis, machine translation, metadata annotation for Semantic Web and other application fields, besides. In addition, the NER also plays an important role in the transition from natural language processing technology towards practical application. In the actual natural language sequence, there is a phenomenon of nested entities in which one entity contains one or more entities. For example, in the text "Activation of the cd28 surface receptor provides", "cd28 surface" is a Protein entity, and "cd28 surface receptor" is also a Protein entity. The Recognition of Nested Named Entity is a difficult problem in named entity recognition, and is used to identify nested entities in the text. The key to specific recognition lies in how to determine the boundary of the entity and predict the category of the entity.

Existing nested entity recognition methods are mainly divided into the following three categories: (1) Extracting entities in natural language by designing text matching rules, such as matching entities in text by manually writing rules of domain experts; (2) Supervised learning methods based on feature engineering, such as prediction of text categories in text sequences by designing feature templates and combining with Viterbi algorithm; (3) The entity-span-based deep learning methods, where a neural networks to extract character-level features of text, and a candidate entity methods that directly enumerate subsequences that are likely to be entities and then predict the subsequences. Although the existing technology can help realize Nested Entity Recognition to a certain extent, there are still obvious defects. For example, the rules are written manually by domain language experts in the first type of methods, which is extremely time-consuming, labor-intensive and has poor inter-domain transferability. The second type of methods belongs to statistical machine learning methods, which are vulnerable to the distribution of text corpus and have poor generalization ability. Although the deep learning method in the third type of methods can extract the character and word features of the text, many learning parameters are involved and there is high computational complexity, while the exhaustive candidate entity method increases the time complexity of the model, and the simple enumeration of text subsequences is not conducive to improving the performance of the model.

BRIEF SUMMARY OF THE PRESENT DISCLOSURE

The present disclosure aims to provide a Nested Named Entity Recognition method based on part-of-speech awareness, device, system and storage medium therefor. By using heterogeneous graph representation learning for nested entity recognition, introducing part-of-speech knowledge to initialize text features, combined with a part-of-speech path-based empty random walk algorithm based on sampling to obtain more neighbor node information, ordinary entities and nested entities are effectively recognized and processed through a heterogeneous graph based on the Deep Graph Library framework. This improves the accuracy and learning efficiency of Nested Named Entity Recognition and further improves the performance and advantages of Nested Named Entity Recognition model.

In order to solve the above technical problems, the present disclosure provides a Nested Named Entity Recognition method based on part-of-speech awareness, device, system and storage medium therefor.

In a first aspect, the present disclosure relates to a Nested Named Entity Recognition method based on part-of-speech awareness, comprising:

obtaining text word data of text to be recognized, wherein the text word data includes text sequence ID, part of speech category, word frequency and word vector representation;

performing feature extraction on the text word data by using a BiLSTM model to obtain a corresponding text word depth feature, and initializing each text word of the text to be recognized into a corresponding graph node according to the text word depth feature;

constructing a text heterogeneous graph of the text to be recognized based on a transfer relationship between the graph nodes;

updating the text word depth feature of the graph node in the text heterogeneous graph via an attention mechanism based on the text heterogeneous graph and a preset part-of-speech path;

performing feature extraction on all graph nodes of the updated text heterogeneous graph by using the BiLSTM model, to obtain text word vector representation to be decoded; and decoding and annotating the text word vector representation to be decoded, to obtain a nested named entity recognition result.

In a further embodiment, the step of obtaining text word data of text to be recognized specifically comprises:

setting a corresponding text sequence ID to each text word in an order of a position of each text word in the text to be recognized;

performing lexical annotation on the text to be recognized, and performing lexical classification and word frequency statistics on each text word in the text to be recognized based on a lexical annotation result to obtain a corresponding speech category and word frequency; and generating word vector representation of each text word in the text to be recognized by using the BERT model.

In a further embodiment, the step of performing feature extraction on the text word data by using a BiLSTM model to obtain a corresponding text word depth feature specifically comprises:

concatenating and integrating the text sequence ID, the part of speech, the word frequency and the word vector representation of the text word data to obtain a text word initial feature; and performing feature extraction on the text word initial feature by using the BiLSTM model, to obtain the text word depth feature, wherein the text word depth feature is expressed as follows:

$$h(x_i)=BiLSTM(F(x_i)) \tag{1}$$

wherein in the formula (1), $$F(x_i) = \left[x_i^{id}, \ x_i^{cat}, \ x_i^{freq}, \ x_i^{nembed}\right], x_i, F(x_i)$$

and $h(x_i)$ represent text word data, text word initial feature and text word depth feature of an i-th text word, respectively, $$x_i^{id}, x_i^{cat}, x_i^{freq} \text{ and } x_i^{nembed}$$

represent text sequence ID, part of speech category, word frequency and word vector representation of i-th text word data.

In a further embodiment, the text heterogeneous graph of the text to be recognized is expressed as follows:

$$G=(V, E, Ov, Path) \tag{2}$$

wherein in the formula (2), V represents a node set composed of different part-of-speech text words, and a value of each node is the text word depth feature, E represents a set of edges composed of nodes, Ov represents a set of part-of-speech types of nodes, Path represents the preset part-of-speech path, which includes a verb and noun path, a noun modifiers and noun path, a connectives and noun path, and a verb modifiers and verb paths.

In a further embodiment, the step of updating the text word depth feature of the graph node in the text heterogeneous graph via an attention mechanism based on the text heterogeneous graph and a preset part-of-speech path specifically comprises:

performing a depth-first traversal of the text heterogeneous graph according to each preset part-of-speech path to obtain a corresponding graph node sequence;

sampling a neighbor node of each graph node in each preset part-of-speech path according to the graph node sequence to obtain a corresponding neighbor node set;

integrating node information of the neighbor node set of each graph node in each preset part-of-speech path by means of the attention mechanism to obtain corresponding graph node representation, wherein the graph node representation is expressed as follows:

$$node_v^{att_k} = \sum_{N_j^{Path_i} \in N_v^{Path_i}} a_j^k N_j^{Path_i} \tag{3}$$

wherein in the formula (3), $$N_v^{Path_i} = DilatedRandomWalk(v),$$

$$a_j^k = \frac{\exp\left(LeakyReLU\left(u^T N_j^{Path_i}\right)\right)}{\sum_{N_j^{Path_i} \in N_v^{Path}} \exp\left(LeakyReLU\left(u^T N_j^{Path_i}\right)\right)} N_j^{Path_i},$$

graph node v represents a graph node in an ith preset part-of-speech path $Path_i$, and is valued as a corresponding text word depth feature, $$N_v^{Path_i}$$

represents a neighbor node set corresponding to a graph node in the i-th preset part-of-speech path $Path_i$, $$N_j^{Path_i}$$

represents a j-th neighbor node of the graph node v in the i-th part-of-speech path $Path_i$, k represents a number of attention heads in the attention mechanism, $$a_j^k$$

represents a weight coefficient of the j-th neighbor node of the graph node v in the i-th part-of-speech path $Path_i$, $$node_v^{att_k}$$

represents graph node representation of the graph node v calculated by means of attention of k attention heads, exp(•) represents an exponential function with base e, LeakyReLU (•) represents the activation function, $u^T$ represents an edge weight matrix; and updating the word frequency and word the vector representation of the corresponding graph node in the text heterogeneous graph according to the graph node representation.

In a further embodiment, the step of sampling a neighbor node of each graph node in each preset part-of-speech path according to the graph node sequence to obtain a corresponding neighbor node set specifically comprises:

obtaining a number of nodes in each preset part-of-speech path, and determining a base sampling interval based on the number of nodes; and randomly obtaining a plurality of neighbor nodes corresponding to each graph node in the preset part-of-speech path in the graph node sequence according to a preset sampling probability and a sampling stopping condition by using an integer multiple of the base sampling interval as a moving step, to obtain the corresponding neighbor node set, wherein the sampling stopping condition is that a total number of neighbor nodes obtained by sampling meets a preset number requirement and a number of nodes corresponding to each part of speech category in the neighbor nodes meets a preset proportion requirement.

In a further embodiment, the step of decoding and annotating the text word vector representation to be decoded, to obtain a nested named entity recognition result specifically comprises:

decoding and annotating the text word vector representation to be decoded using a conditional random field to obtain a named entity identification result and corresponding first annotated text word vector representation;

employing an improved LSTM unit to perform boundary detection on the first annotated text word vector representation to determine whether there are entity boundary words in the first annotated text word vector representation, wherein the improved LSTM unit is obtained by adding a multilayer perceptron MLP to an output hidden layer of the LSTM unit;

if entity boundary words exist in the first annotated text word vector representation, merging the first annotated text word vector representation between adjacent two of the entity boundary words to obtain second annotated text word vector representation, and performing decoding, annotation, and boundary detection on the second annotated text word vector representation to start a next round of entity recognition iteration, and vice versa, stopping a current iteration and using the named entity recognition result as a forward named entity recognition result;

reverse filling according to the text word vector representation corresponding to the forward entity recognition result to obtain third annotated text word vector representation, and merging the third annotated text word vector representation with text word vector representation corresponding to a previous round of entity recognition iteration to obtain fourth annotated text word vector representation; and decoding and annotating the fourth annotated text word vector representation using conditional random fields to obtain the nested named entity recognition result.

In a second aspect, the present disclosure relates to a Nested Named Entity Recognition system based on part-of-speech awareness, comprising:

a preprocessing module, which is used for obtaining text word data of text to be recognized, wherein the text word data includes text sequence ID, part of speech category, word frequency and word vector representation;

a node initialization module, which is used for performing feature extraction on the text word data by using a BiLSTM model to obtain a corresponding text word depth feature, and initializing each text word of the text to be recognized into a corresponding graph node according to the text word depth feature;

a graph construction module, which is used for constructing a text heterogeneous graph of the text to be recognized based on a transfer relationship between the graph nodes;

a node update module, which is used for updating the text word depth feature of the graph node in the text heterogeneous graph via an attention mechanism based on the text heterogeneous graph and a preset part-of-speech path;

a feature optimization module, which is used for performing feature extraction on all graph nodes of the updated text heterogeneous graph by using the BiLSTM model, to obtain text word vector representation to be decoded; and a result generation module, which is used for decoding and annotating the text word vector representation to be decoded, to obtain a nested named entity recognition result.

In a third aspect, the present disclosure relates to an electronic device, comprising a memory, a processor, and a computer program stored in the memory and executable on the processor, wherein the processor performs steps of the Nested Named Entity Recognition method based on part-of-speech awareness according to above when executing the computer program.

In a fourth aspect, the present disclosure relates to a computer-readable storage medium, storing a computer instruction, wherein a processor performs steps of the Nested Named Entity Recognition method based on part-of-speech awareness according to above when executing the computer instruction.

The present disclosure provides a Nested Named Entity Recognition method based on part-of-speech awareness, system, device and storage medium therefor. According to the method, the BiLSTM model is used to extract the feature of the text word data to obtain the text word depth feature after obtaining the text word data of the text to be recognized. Each text word of the text to be recognized is initialized into the corresponding graph node according to the text word depth feature, and the text heterogeneous composition of the text to be recognized is constructed according to the preset part of speech path,. The text word data of the graph nodes is updated by the attention mechanism, and then the BiLSTM model is used to extract the features of all graph nodes of the text heterogeneous graph. After obtaining the word vector representation of the text to be decoded, the conditional random field is used for decoding and annotation, and the nested named entity recognition result is obtained. Compared with the current technology, the Nested Named Entity Recognition method based on part-of-speech awareness uses heterogeneous representation learning for nested entity recognition, introduces part-of-speech knowledge to initialize text features, and combines with a part-of-speech path-based empty random walk algorithm designed to obtain more neighbor node information by sampling. In this way, the ordinary entities and nested entities are effectively recognized and processed through heterogeneous graph based on the Deep Graph Library framework, which improves the accuracy and learning efficiency of Nested Named Entity Recognition and further improves the performance and advantages of Nested Named Entity Recognition model.

BRIEF DESCRIPTION OF THE DRAWINGS

FIG. 3 is a schematic flowchart of a Nested Named Entity Recognition method based on part-of-speech awareness according to an embodiment of the present disclosure;

DETAILED DESCRIPTION

In order to make the objectives, technical solutions, and advantages of the embodiments of the present disclosure clearer, the following clearly and completely describes the technical solutions in the embodiments of the present disclosure with reference to accompanying drawings in the embodiments of the present disclosure. Apparently, the described embodiments are some rather than all of the embodiments of the present disclosure. All other embodiments obtained by those of ordinary skill in the art based on the embodiments of the present disclosure without creative efforts shall fall within the scope of protection of the present disclosure.

Figure 1:
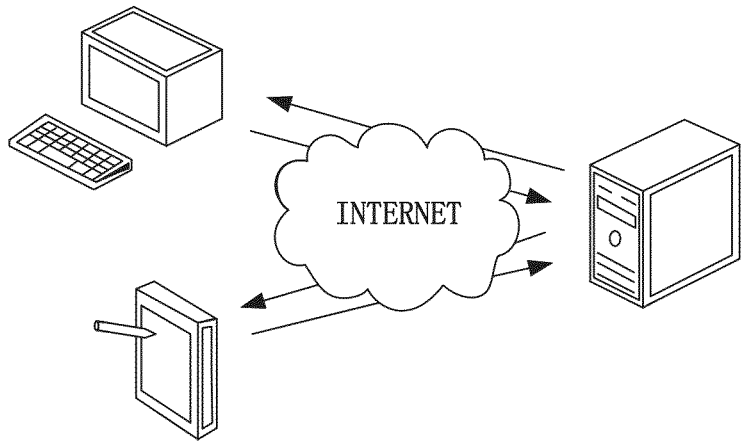
FIG. 1 is a schematic of an application scenario of a Nested Named Entity Recognition method based on part-of-speech awareness in an embodiment of the present disclosure.
Figure 2:
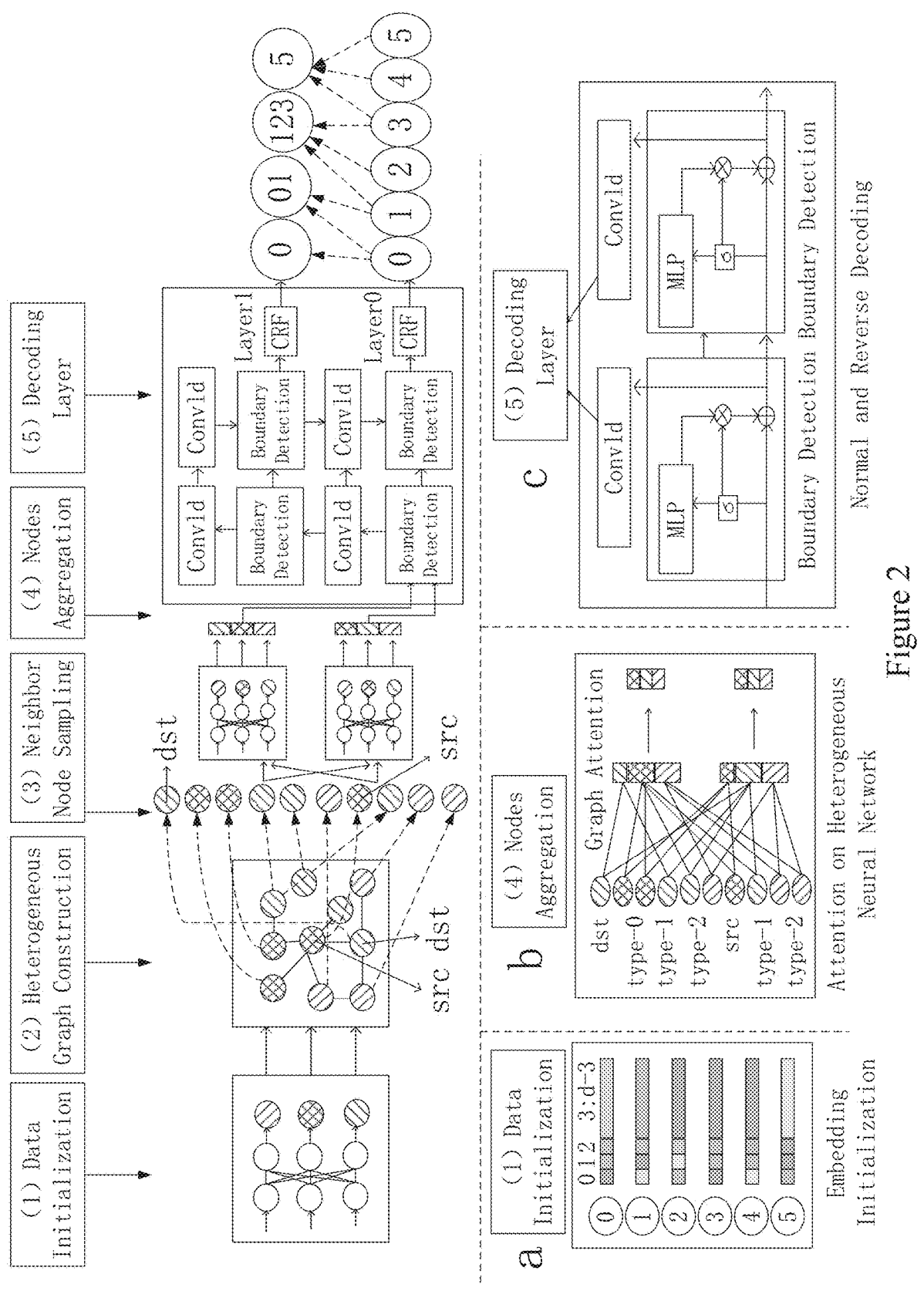
FIG. 2 is a schematic diagram of the structure of a Nested Named Entity Recognition model PANNER based on part-of-speech awareness in an embodiment of the present disclosure.

The Nested Named Entity Recognition method provided by the present disclosure can be applied to a terminal or a server as shown in FIG. 1. The terminal may be, but is not limited to, a variety of personal computers, laptops, smartphones, tablets and portable wearable devices, and the server may be implemented with a standalone server or a server cluster composed of multiple servers. The server may, based on the English text corpus to be recognized, employ the part-of-speech awareness nested named entity recognition method provided by the present disclosure to complete accurate and effective recognition of ordinary named entities and nested named entities in the corresponding text corpus in accordance with the part-of-speech awareness nested entity recognition model shown in FIG. 2, and apply the final obtained ordinary named entity and nested named entity recognition results to other learning tasks on the server, or transmit them to the terminal for the end-user to receive them.

In an embodiment, as shown in FIG. 3, a Nested Named Entity Recognition method based on part-of-speech awareness is provided, comprising:

S11, obtaining text word data of text to be recognized, wherein the text word data includes text sequence ID, part of speech category, word frequency and word vector representation, wherein the corpus of the document of the text to be recognized is any English text sequence to be recognized by nested named entities, and the corresponding text word data is the data obtained after pre-processing each text word in the text to be recognized, i.e., the data features required for subsequent nested named entity recognition, and the text sequence ID and part of speech category of the corresponding text word data will not change during subsequent training and learning, while the word frequency and word the vector representation will be continuously updated. Specifically, the step of obtaining text word data of text to be recognized comprises:

setting a corresponding text sequence ID to each text word in an order of a position of each text word in the text to be recognized; and annotating the text to be recognized using part-of-speech. According to a part-of-speech annotating result, carry out part-of-speech classification and word frequency statistics to each text word in the text to be recognized, in order to obtain a corresponding part-of-speech category and word frequency, wherein part-of-speech annotation adopts the current existing English text part-of-speech tagging tools, such as NLTK or STANFORDNLP, which can realize the part-of-speech annotating of the text to be recognized, and there are no specific restrictions here; the part-of-speech categories can be divided according to the existing part-of-speech categories of English words. However, considering that there are too many neutral words, in order to improve the follow-up learning efficiency, this embodiment classifies the part of speech of English words and obtains the categories shown in Table 1; the word frequency indicates the frequency of occurrence of each text word; suppose that there are N different words in the text to be recognized, and there are C types in total different categories, the length of the text to be recognized is T, wherein the t-th text word occurs f times, and the part of speech classification is c, $t \in T$, $c \in C$, the text sequence ID of the word: id=t; part of speech category: cat=c; word frequency: freq=f/T, for example, the text to be recognized is "Guangzhou University is located in Guangzhou, the capital of Guangdong", then the part-of-speech annotation tool is used to obtain the part of speech of the text, Table 2 shows the text sequence id, part of speech, part of speech category and word frequency information.

TABLE 1

| | classification of part of speech | | |
|---|---|---|---|
| Id | Group | Symbols | Meaning |
| 1 | Nouns | NN, NNS, NNP, NNPS | The singular and plural nouns; singular and plural proper nouns |
| 2 | Verbs | VB, VBP, VBZ, VBD, VBN, VBG | The basic form of verbs, the singular and plural forms of three tenses |
| 3 | Noun modifier | CD, JJ, JJS, JJR, PP, PRP, PRP$, RP, DT | Cardinal numbers, adjectives, possessive pronouns and other vocabularies that modify nouns |
| 4 | Verbs modifier | RB, RBR, RBS, WRB | Modifiers of words such as verbs and adjectives |
| 5 | Relations | MD, CC, IN, TO, WDT, WP, WP$, EX, POS | Indicates the relationship between words or sentences |
| 6 | Other | comma,, period., colon:, quotation mark", sentence separator LS | Delimiter for text sequence |

In Table 1, the first group is the set of all nouns, including singular and plural nouns and proper nouns. The second group is the set of verbs, including their basic forms, third person singular forms, past tense, etc. The third group is the modifiers of nouns, including base words, adjectives, comparative and highest levels of adjectives, etc. The fourth group is the modifiers of verbs, including adverbs, qualifiers, etc. The fifth group is the relational words, including modal verbs, conjunctions, prepositions, etc. The sixth group is the article identifiers, including commas, periods and paragraph separators, etc., which will be removed from this group in practical applications.

TABLE 2

| information of the id, part of speech, part of speech category and word frequency of the corpus | | | | | | | | | |
|---|---|---|---|---|---|---|---|---|---|
| corpus | Guangzhou | University | is | located | in | the | capital | of | Guangdong |
| id | 0 | 1 | 2 | 3 | 4 | 5 | 6 | 7 | 8 |
| part of speech | Noun | Noun | VBS | VBS | IN | DT | Noun | CC | Noun |
| part of speech category | Noun | Noun | Verbs | Verbs | Relations | Noun modifier | Noun | Noun modifier | Noun |
| word frequency | 2/10 | 1/10 | 1/10 | 1/10 | 1/10 | 1/10 | 1/10 | 1/10 | 1/10 |

The word vector representation of each text word in the text to be recognized is generated through the Bidirectional Encoder Representation from Transformers (BERT) model. The BERT model is an NLP pre-training technique, which is, the Encoder of the bidirectional Transformer, which can be used to train the vector representation of a text sequence, and can also train the vector representation of each word in the text sequence. In the present embodiment, considering that the position of the word is strongly correlated with the semantics of the text to be recognized Chinese and in order to facilitate the subsequent random batch training corresponding to neighbor node sampling, the BERT model is selected to effectively train the word vector of each word in the recognized text, and then obtain the word vector representation in the text word data, and the word vector representation will be updated accordingly in the subsequent neighbor node sampling random batch training.

S12, performing feature extraction on the text word data by using a BiLSTM model to obtain a corresponding text word depth feature, and initializing each text word of the text to be recognized into a corresponding graph node according to the text word depth feature, wherein the BiLSTM model is a bidirectional LSTM network encoder, by which this implementation performs forward feature extraction and inverse feature extraction on text word data, and splices the obtained forward features and inverse features to obtain the corresponding text word depth features, the specific steps are as follows:

concatenating and integrating the text sequence ID, the part of speech, the word frequency and the word vector representation of the text word data to obtain a text word initial feature, wherein the initial features of text words are text sequence id, part of speech category, word frequency and word vector representation of the stitched d-dimensional word vector, and the text sequence ID and part of speech each occupy 1 dimension, and the word frequency and word the vector representation together occupy 2 dimensions, which is expressed as follows:

$$F(x_i) = \left[ x_i^{id}, x_i^{cat}, x_i^{freq}, x_i^{nembed} \right] \tag{1}$$

wherein in the formula (1), $x_i$, $F(x_i)$ and $h(xi)$ represent text word data, text word initial feature and text word depth feature of an i-th text word, respectively, $x_i^{id}, x_i^{cat}, x_i^{freq}$ and $x_i^{nembed}$ represent text sequence ID, part of speech category, word frequency and word vector representation of i-th text word data.

The BiLSTM model is adopted to carry out feature extraction to initial feature of the text word, obtain depth feature of the text word; and the depth feature of the text word is expressed as follows:

$$h(x_i)=\text{BiLSTM}(F(x_i)) \tag{2}$$

wherein in the formula (2), $h(x_i)$ represents depth feature of the text word, which is, the hidden layer vector of preprocessed text words of text word $x_i$ after being encoded by the BiLSTM model, wherein, the corresponding BiLSTM model is implemented as follows:
using the BiLSTM network encoder to input the text to be recognized in the forward order to encode each text word, and obtain the positive features $\overrightarrow{h_1}$ of each text word in the text to be recognized according to the following formula:

$$f_i=\sigma(w_f \cdot [h_{i-1}, F(x_i)]+b_f)$$

$$i_i=\sigma(w_i \cdot [h_{i-1}, F(x_i)]+b_i)$$

$$\tilde{C}_i=\tanh(w_c \cdot [h_{i-1}, F(x_i)]+b_c)$$

$$C_i=f_i*C_{i-1}+i_i*\tilde{C}_i$$

$$o_i=\sigma(w_o \cdot [h_{i-1}, F(x_i)]+b_o)$$

$$\overrightarrow{h_1}=o_i \cdot \tanh(C_i) \tag{3}$$

wherein in the formula (3), $F(x_i)$ represents the initial feature of the i-th text word in the text to be recognized, $h_{i-1}$, $f_i$, $i_i$, $\tilde{C}_i$, $C_i$ and $o_i$ represent the previous cell state, forget gate output, memory gate output, temporary cell state, current cell state and output gate of the i-th text word in the text to be recognized, respectively; w and b represent the weight and bias terms of the three gates and the three states, respectively.

As described above, then using the BiLSTM network encoder to input each text word in the inverse order of the text to be recognized to obtain the inverse features $\overleftarrow{h_1}$ of each text word in the text to be recognized, the inverse features $\overleftarrow{h_1}$ is expressed as follows:

$$\overleftarrow{h_1}=\overleftarrow{o_1} \cdot \tanh(\overleftarrow{C_1})$$

After obtaining the forward feature $\vec{h_1}$ and the inverse feature $\overleftarrow{h_1}$ of the text word using the above steps, the two are stitched together to obtain the text word depth feature $h_i$, and the text word depth feature $h_i$ is expressed as follows:

$$h_i = \text{Concat}(\vec{h_1}, \overleftarrow{h_1}) \tag{4}$$

wherein in the formula (4), Concat(•) represents the function that splices two vectors horizontally by row. To ensure efficient of subsequent processing using the text word depth feature, the text word depth features $h_i$ obtained above can be further normalized.

Figure 4:
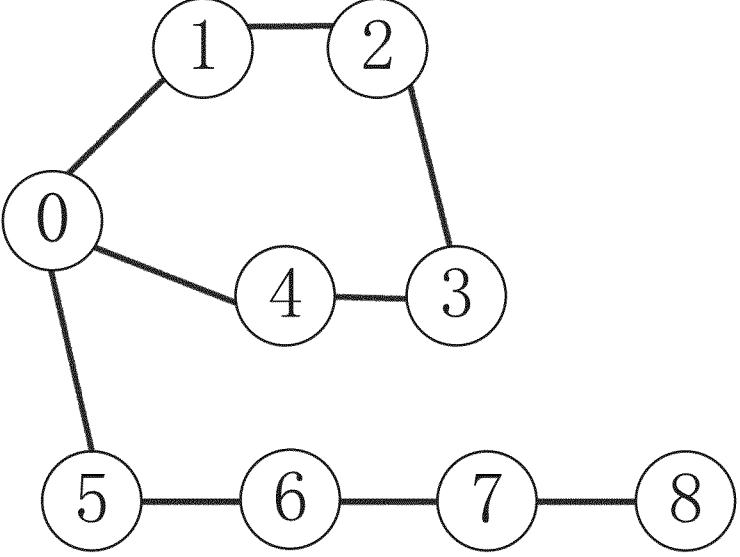
FIG. 4 is the text heterogeneous graph which includes multiple different parts of speech nodes.

S13, constructing a text heterogeneous graph of the text to be recognized based on a transfer relationship between the graph nodes, wherein the heterogeneous graph is shown in FIG. 4 and is composed of nodes (Vertex) and edges (Edge), and there are different types of nodes and edges (at least one node and edge has multiple types), which is common in the scenario of knowledge graph, and the simplest way to deal with heterogeneous information is to use one-hot coding type information and stitch it on the original representation of the node. In the present embodiment, according to the text word depth feature $h_i$ initialized by each graph node composed of each figure node to be recognized is represented as follows:

$$G = (V, E, Ov, \text{Path}) \tag{5}$$

wherein in the formula (5), V represents a node set composed of different part-of-speech text words, and the value of each node is the text word depth feature, E represents the set of edges composed of nodes, and the logarithm of the ratio of the product of word co-occurrence frequency and word frequency of the node on the edge is used as the weight of the edge, Ov represents the set of part-of-speech types of nodes, Path represents the preset part-of-speech path, which includes verb and noun paths, noun modifiers and noun paths, connectives and noun paths, and verb modifiers and verb paths. It should be noted that the preset part-of-speech path can follow the steps according to the actual recognized text content: count the proportion of words in the part-of-speech category in the corpus, select the part-of-speech category with the highest proportion of words and high degree of overlap with the named entity, and reasonably design the corresponding part-of-speech path as the center, so as to introduce grammar knowledge, rely on the Deep Graph Library (DGL) to create heterogeneous maps, and facilitate the subsequent calculation of heterogeneous images. The present embodiment selects a text sequence in the GENIA dataset, considering that the noun in the dataset accounts for the largest proportion, and the noun and the named entity have a high degree of coincidence, the preset part-of-speech path shown in Table 3 is designed with the noun as the center.

TABLE 3

| preset part-of-speech paths with the noun as the center | | |
| --- | --- | --- |
| Path_id | Path | Path_node |
| 1 | Verbs-Nouns | 2-1 |
| 2 | Noun modifier-Nouns | 3-1 |
| 3 | Verbs modifier-Verbs | 4-2 |
| 4 | Relations-Nouns | 5-1 |

In Table 3, the four paths are centered on nouns, including: preset part-of-speech path 1 (relationship between a verb and noun), preset part-of-speech path 2 (relationship between a noun modifier and noun), preset part-of-speech path 3 (relationship between a verb modifier and verb) and preset part-of-speech path 4 (relationship between a connective word and noun), and the node that needs to be updated is the node on the part-of-speech path in the subsequent neighbor node sampling process.

The construction of the heterogeneous graph relies on the Deep Graph Library framework, and the original data format is <src, edg, dst>, wherein the src is the source node, the edg is the edge, and the dst is the destination node. The node's initial text word features include node type (part of speech category), node position number (text sequence ID), node occurrence frequency (word frequency), and word vector representation obtained by BERT pre-training. Nodes will be continuously updated in subsequent training. The initial features of include the edge weight (the logarithm of the ratio of the word co-occurrence frequency of the node on the edge to the product of the word frequency), which will be continuously updated in the subsequent training.

S14, updating the text word depth feature of the graph node in the text heterogeneous graph via an attention mechanism based on the text heterogeneous graph and a preset part-of-speech path. The update of the text word depth features of the graph nodes can be understood as updating the word frequency and word the vector representation in the text word depth features of the nodes on all preset part-of-speech paths. In order to obtain more neighbor node information and update the node features on each preset part-of-speech path more reliably and efficiently, this implementation designs a part-of-speech path based on hole random wandering algorithm to sample the neighbor nodes of graph nodes on each preset part-of-speech path, and uses an attention mechanism to calculate the node representations of the corresponding graph nodes to update the text word depth features based on the set of sampled neighbor nodes . Specifically, the step of updating the text word depth feature of the graph node in the text heterogeneous graph via an attention mechanism based on the text heterogeneous graph and a preset part-of-speech path specifically comprises:

performing a depth-first traversal of the text heterogeneous graph according to each preset part-of-speech path to obtain a corresponding graph node sequence;

sampling a neighbor node of each graph node in each preset part-of-speech path according to the graph node sequence to obtain a corresponding neighbor node set, wherein the step of sampling a neighbor node of each graph node in each preset part-of-speech path according to the graph node sequence to obtain a corresponding neighbor node set specifically comprises:

obtaining a number of nodes in each preset part-of-speech path, and determining the basic sampling interval according to the number of nodes. The basic sampling interval is the hole in the above hole random walk algorithm, which means that there will be an interval with a length equal to the number of nodes on the preset part of speech path when sampling, and randomness means that the node sampling selection is random.

randomly obtaining a plurality of neighbor nodes corresponding to each graph node in the preset part-of-speech path in the graph node sequence according to a preset sampling probability and a sampling stopping condition by using an integer multiple of the base sampling interval as a moving step, to obtain the corresponding neighbor node set, wherein the sampling stopping condition is that a total number of neighbor nodes obtained by sampling meets a preset number requirement and a number of nodes corresponding to each part of speech category in the neighbor nodes meets a preset proportion requirement.

Specifically, suppose the text heterogeneous graph is G=(V, E, Ov, Path), V represents the set of nodes, E represents the set of edges, Ov represents the node type, Path represents the predefined lexical path, and the predefined lexical path includes 2-1, 3-1, 4-2, 5-1; the following is an illustration of the neighbor node sampling process using the preset part-of-speech path 2-1 as an example: the nodes on the preset part-of-speech path 2-1 are used as starting positions to perform Depth First Search (DFS) on the graph. The corresponding graph node sequences is {2, 1, 0, 4, 3, 5, 6, 7, 8}; the length (number of nodes) of the preset part-of-speech path 2-1 is 2, then 2 is determined as the base sampling interval, and the 2nd-order neighbor nodes of node 2 on the preset part-of-speech path 2-1 (the integer with node 2) are sampled. Nodes separated by an integer multiple of 2) on preset part-of-speech path 2-1 are sampled, and the 2nd-order neighbors of node 2 are selected as neighbor nodes of node 2 with preset probability p, and their 2nd-order neighbors are discarded with probability 1-p, in the order of 0, 3, 6 and 8. The 2nd-order neighbor nodes of node 1 on part-of-speech path 2-1 (meaning nodes separated by an integer multiple of 2 from node 1) are sampled, and the 2nd-order neighbors of node 1 are selected as neighbor nodes of node 1 with probability p neighbors as the neighbor nodes of node 1, discarding their 2nd order neighbors with probability 1-p, in the order of 4, 5, and 7. It should be noted that the neighbor sampling process of graph nodes in each preset path node stops under the condition that the total number of obtained neighbor nodes reaches the preset number and the number of other types of neighbor nodes also reaches a specific ratio. In order to ensure the generalization ability of the model, the preset probability p of sampling in this implementation is randomly generated, and the proportion of nodes with different part of speech categories of neighbor nodes is the proportion of each part of speech category in the original corpus.

After obtaining a neighbor node set of each graph node in each preset part-of-speech path through the above steps, considering that different classes of neighbor node words have different effects on graph nodes, a reasonable and effective update of each graph node is performed by the following method that uses an attention mechanism to determine the importance of neighbor nodes to the current node.

Integrating node information of the neighbor node set of each graph node in each preset part-of-speech path by means of the attention mechanism to obtain corresponding graph node representation, wherein the graph node representation is expressed as follows:

$$node_v^{att_k} = \sum_{N_j^{Path_i} \in N_v^{Path_i}} a_j^k N_j^{Path_i} \tag{6}$$

$$N_v^{Path_i} = DilatedRandomWalk(v)$$

$$a_j^k = \frac{exp\left(LeakyReLU\left(u^T N_j^{Path_i}\right)\right)}{\sum_{N_j^{Path_i} \in N_v^{Path}} exp\left(LeakyReLU\left(u^T N_j^{Path_i}\right)\right)} N_j^{Path_i}$$

Wherein in the formula (6), v represents a graph node in an ith preset part-of-speech path Path$_i$, and is valued as a corresponding text word depth feature, $$N_v^{Path_i}$$

represents a neighbor node set corresponding to a graph node in the i-th preset part-of-speech path Path$_i$, $$N_j^{Path_i}$$

represents a j-th neighbor node of the graph node v in the i-th part-of-speech path Path$_i$, k represents a number of attention heads in the attention mechanism, $$a_j^k$$

represents a weight coefficient of the j-th neighbor node of the graph node v in the i-th part-of-speech path Path$_i$, $$node_v^{att_k}$$

represents graph node representation of the graph node v calculated by means of attention of k attention heads, exp(•) represents an exponential function with base e, LeakyReLU (•) represents the activation function, $u^T$ represents an edge weight matrix, and the weight matrix is continuously updated during the sampling process as the word frequency and word co-occurrence frequency of the edge nodes change.

The above cavity random walk algorithm named DilatedRandomWalk is implemented as follows:

---

ALGORITHM 1: THE DILATED RANDOM WALK.

---

```
INPUT :        G = (V,E,O_V,Path), N_FREQ
OUTPUT:        N_V^Path
  N_DFS=DFS(G)
  S_NODE=N_FREQ · N_DFS
  FOR P_I ∈ P DO
       GET_P = RANDOM( )
       STEP = LEN (P_I)
       FOR V = 0 TO STEP DO
            WHILE LEN (N_V^Path) < S_NODE DO
            IF GET_P≤V_FREQ THEN N^P_V ←V'S STEP-ORDER
            NEIGHBOR;
            ELSE NEXT NODE;
  RETURN N_V^Path
```

---

The word frequency and word the vector representation of the corresponding graph node is updated in the text heterogeneous graph according to the graph node representation.

S15, obtaining the text word vector representation to be decoded by using features from all graph nodes within the updated text heterogeneous graph extracted by the BiLSTM model, wherein the text word vector representation to be decoded can be understood as obtained by BiLSTM feature extraction of all graph nodes $$node_v^{att}$$

in the predetermined part-of-speech path and graph nodes $node_P$ not in the predetermined part-of-speech path, which can be expressed as follows:

$$v^f = BiLSTM(node_v^{att} + node_P) \tag{7}$$

Figure 5:
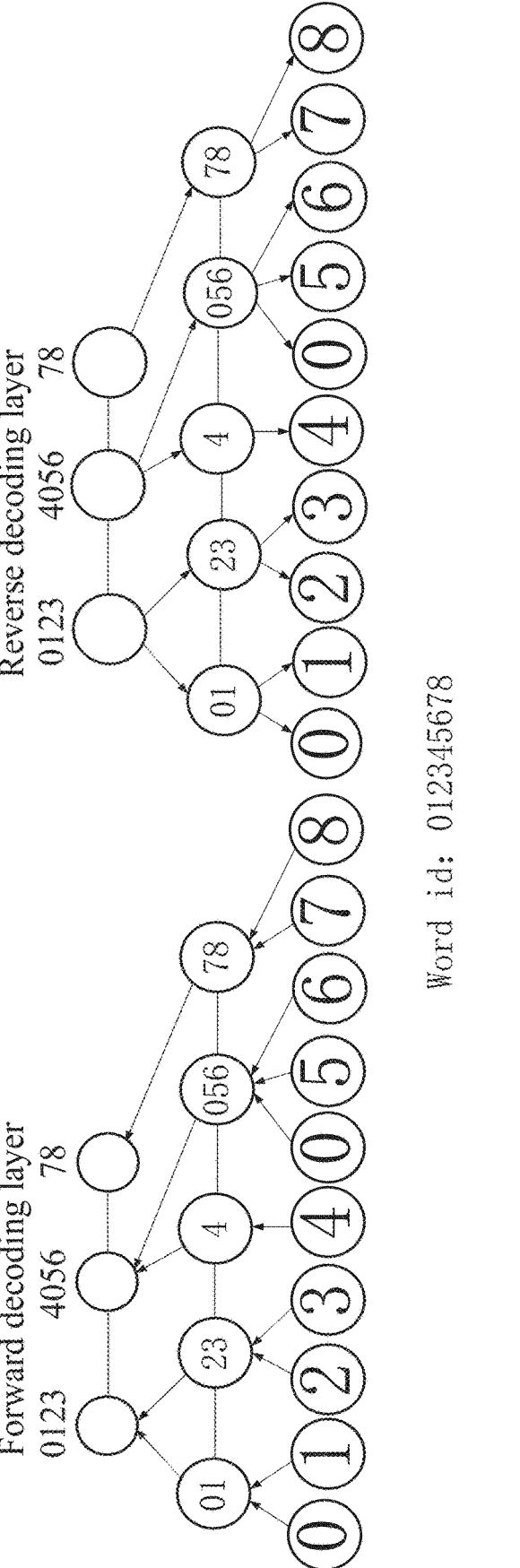
FIG. 5 is an example diagram of bottom-up forward decoding and top-down reverse decoding in an embodiment of the present disclosure.

In the formula (7), $v^f$ represents the set of all nodes in the heterogeneous graph, including nodes on the part-of-speech path and $node_P$ that are not on the part-of-speech path; the process of feature extraction of graph nodes by the BiLSTM model can be found in the previous section for obtaining the text word depth features of individual text words, which will not be repeated in the present disclosure;

S16, decoding and annotating the text word vector representation to be decoded, to obtain a nested named entity recognition result, wherein the results of nested named entity recognition are shown in FIG. 5, which is obtained by decoding layer by layer, combining bottom-up and top-down approaches for joint decoding of named entities. Specifically, the step of decoding and annotating the text word vector representation to be decoded, to obtain a nested named entity recognition result comprises:

decoding and annotating the text word vector representation to be decoded using a conditional random field to obtain a named entity identification result and corresponding first annotated text word vector representation, wherein the conditional random field CRF model is represented as follows:

$$P(y|v_1^f, \lambda) = \frac{1}{Z(v_1^f)} \exp \sum_{j=1}^{j} \sum_{i=1}^{t} \lambda_j f_j(y_{i-1}, y_i, v_i^f, i) \tag{8}$$

$$Z(v_i^f) = \sum_y \exp \sum_{j=1}^{j} \sum_{i=1}^{t} \lambda_j f_j(y_{i-1}, y_i, v_i^f, i)$$

In the formula (8), $$P(y|v_i^f, \lambda)$$

represents the probability of each label, y represents the label; $f_j$ represents the feature function; $\lambda$ represents the weight of the feature function;

$$v_i^f$$

represents one node in the heterogeneous graph; and $$Z(v_i^f)$$

represents the normalization factor.

Figure 6:
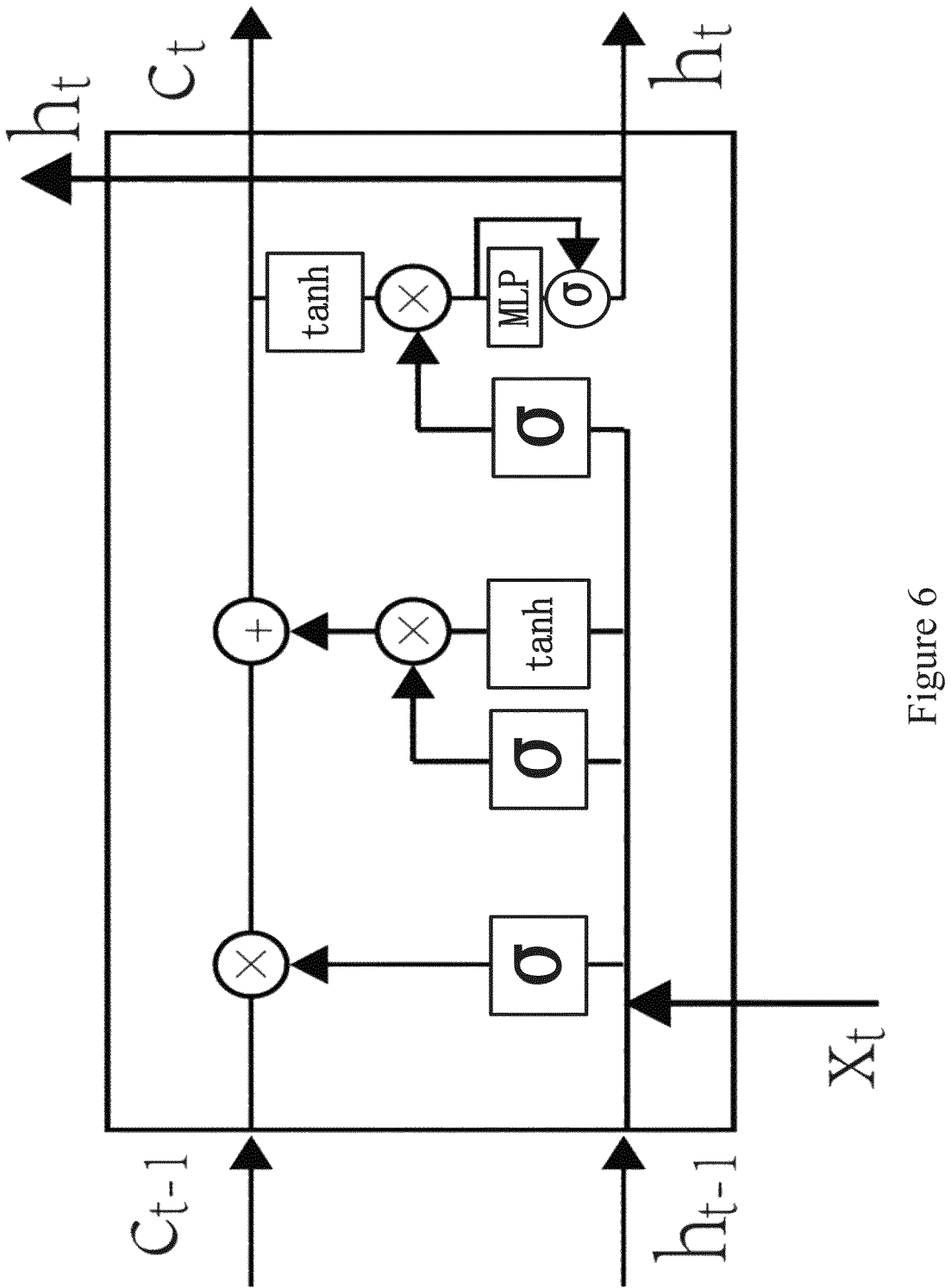
FIG. 6 is a schematic diagram of the structure of an improved LSTM unit for boundary detection in an embodiment of the present disclosure.

A modified LSTM unit is used to perform boundary detection on the first labeled text word vector representation and determine whether there are entity boundary words in the first labeled text word vector representation; the modified LSTM unit is obtained by adding a multilayer perceptron MLP to an output hidden layer of the LSTM unit; wherein, the modified LSTM unit is shown in FIG. 6, compared to the LSTM unit, in which the output hidden layer, two nonlinear activation layers and a fully connected layer classifier named SOFTMAX are added to the output hidden layer. In this embodiment, the use of the LSTM unit with the introduction of the multilayer perceptron MLP for boundary word recognition of text and the incorporation of boundary information into the hidden layer vector provides a reliable and effective basis for subsequent ordinary entity recognition and nested entity recognition.

If entity boundary words exist in the first annotated text word vector representation, merging the first annotated text word vector representation between adjacent two of the entity boundary words to obtain second annotated text word vector representation, and performing decoding, annotation, and boundary detection on the second annotated text word vector representation to start a next round of entity recognition iteration, and vice versa, stopping a current iteration and using the named entity recognition result as a forward named entity recognition result. The merging method of said first labeled text word vector representations between adjacent said entity boundary words can be selected according to the actual application requirements, the present embodiment preferably adopts a one-dimensional convolutional neural network Conv1d with a kernel size of 2, and the sliding window size n can be determined according to the actual number of detected text words between the entity boundary words. That is, a one-dimensional convolutional neural network is used to merge the entity boundary words and their intermediate sequences are merged, and the sequence composed of several words obtained corresponds to the second labeled text word vector indicating that the corresponding starting range of the text region is [t, t+n], and the one-dimensional convolutional neural network is denoted as follows:

$$\tilde{x}_{l+1} = Conv1d(\tilde{x}_t^l, \tilde{x}_t^{l+n}) \tag{9}$$

In the formula (9), $$\tilde{x}_t^l$$

represents the first labeled text word vector representation of the t-th word before merging corresponding to the 1st named entity recognition iteration, $$\tilde{x}_t^{l+n}$$

represents the first labeled text word vector representation of the (t+n)-th word, $$\tilde{x}_t^{l+1}$$

represents the second labeled text word vector representation of the t-th word after merging, Conv1d(•) represents a one-dimensional convolutional neural network.

The process of positive named entity recognition results obtained through the above steps is referred to as the bottom-up decoding process. In order to minimize recognition errors, the following top-down reverse decoding process is added for bias correction after the completion of the bottom-up positive decoding.

According to the text word vector representation corresponding to said forward entity recognition result, inverse padding is performed to obtain a third labeled text word vector representation. The third labeled text word vector representation is merged with the text word vector representation corresponding to the last round of entity recognition iteration to obtain a fourth labeled text word vector representation. The inverse padding is performed by adopting a one-dimensional convolutional neural network Conv1d to re-paddle the current decoded sequence to make the total sequence length consistent with the previous layer, thereby obtaining the same length as that of the text word vector representation corresponding to the previous round of entity recognition iteration. Conv1d is used to re-fill the current decoded sequence to make the total sequence length consistent with the previous layer, and then obtain the third labeled text word vector representation with the same length as the text word vector representation corresponding to the previous round of entity recognition iteration. Here the process of reverse padding and re-decoding can be referred to as the top-down decoding process.

A conditional random field is used to decode and label said fourth labeled text word vector representation to obtain said nested named entity recognition result. The present embodiment effectively ensures the accuracy of nested named entity recognition by decoding layer by layer, combined with bottom-up and top-down joint decoding.

The implementation process of the PANNER model corresponding to the part-of-speech-awareness nested named entity recognition method in this application is as follows:

---

Algorithm 2: The overall procedure of PANNER.

---

Input:   The heterogeneous graph with features G = (V, E, $O_V$, Path);
         The number of attention head K.
Output:  The embedding with attention $v^f$;

The attention coefficient $\alpha$.
         $N_v^{Path}$ = DilatedRandomWalk (G, $n_{f\ req}$)
         for k ∈ K do
         for i ∈ $N^{Path}$ do
             Calculate the attention coefficient $\alpha$
         Calculating all the attention head and the context features.

$$\text{node}_v^{att} = \sum_{k=1}^{K} W_k \times \text{node}_v^{att_k}$$

$v^f$ = BiLSTM ($\text{node}^{att} \cup \text{node}_P$)
Calculate the Negative Log Likelihood Function

---

18

---

Algorithm 2: The overall procedure of PANNER.

---

Back propagation and update model's parameters in PANNER.
return $\alpha$, $v^f$

---

The embodiment of the present disclosure initializes the text word data by introducing part-of-speech knowledge, and uses the BiLSTM model to extract text word depth features based on the text word data, initializes it as a graph node, and constructs text heterogeneity corresponding to the text to be recognized based on the grammatical relationship, combined with a design of a part-of-speech path based on hollow random walk algorithm that samples more neighbor node information, relies on the Deep Graph Library framework to effectively identify and process ordinary entities and nested entities, and improve nested naming while improving the accuracy and learning efficiency of entity recognition, it further improves the performance and advantages of the nested named entity recognition model.

Figure 7:
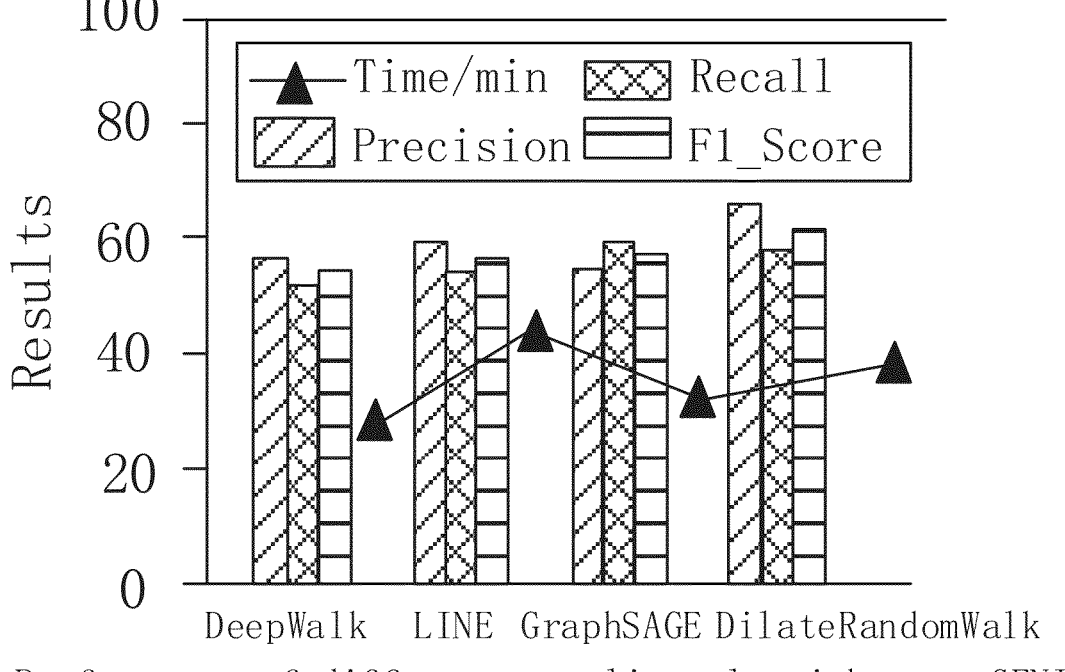
FIG. 7 is the performance of different sampling algorithms and the comparison results of time consumption of the same sampling node.
Figure 8:
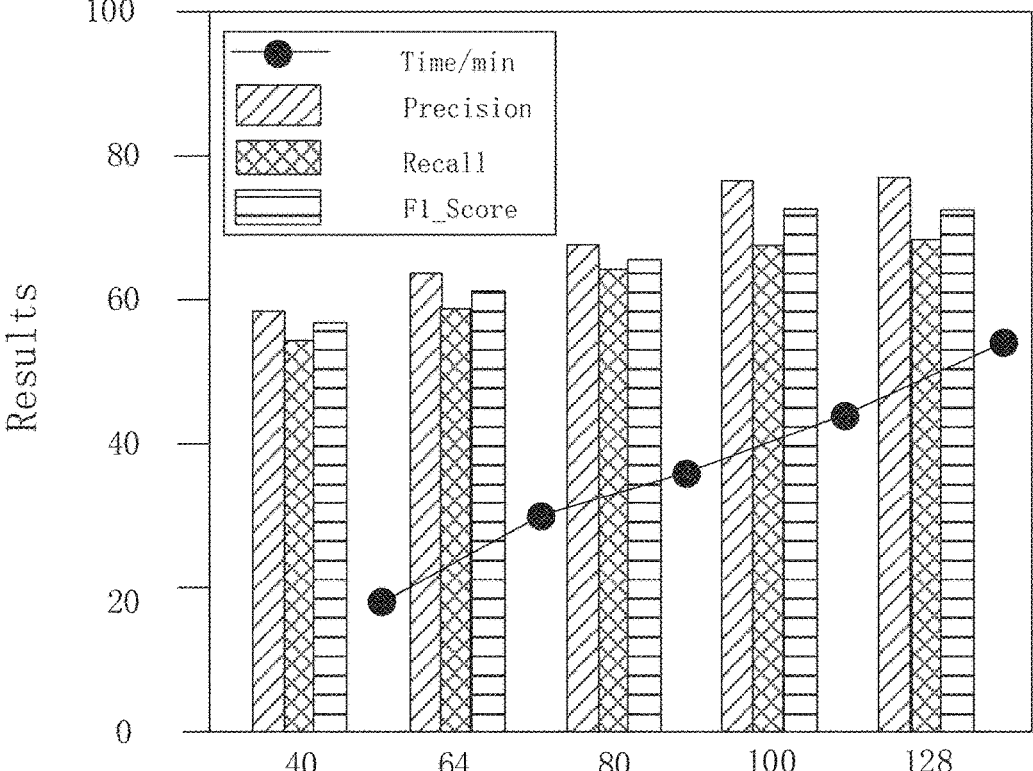
FIG. 8 is a schematic representation of the effect of the number of sampled nodes on the performance and time consumption of the PANNER model in an embodiment of the present disclosure.
Figure 9:
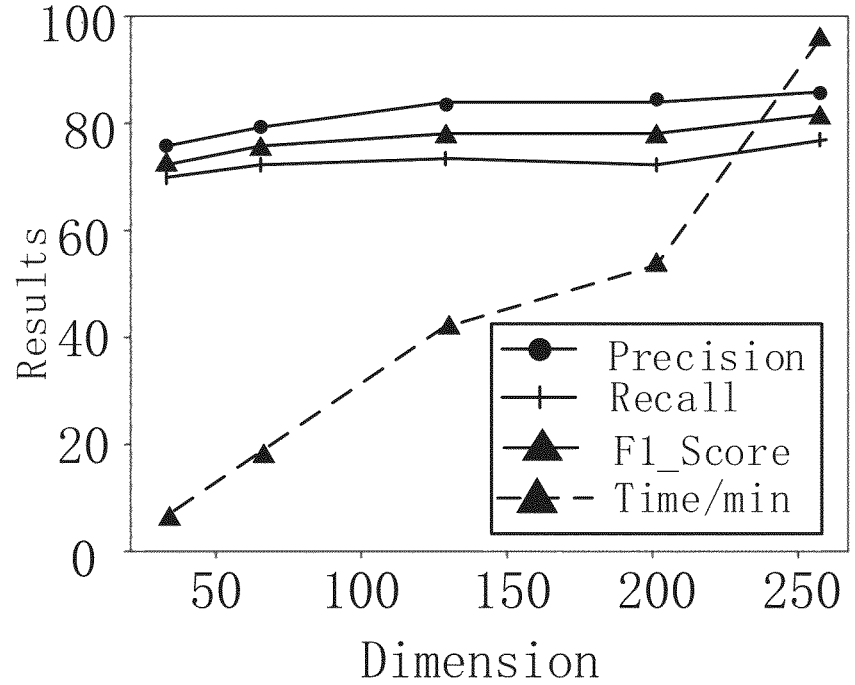
FIG. 9 is a schematic representation of the effect of word vector dimensionality on the performance and time consumption of the PANNER model in embodiments of the present disclosure.

In order to verify the technical effectiveness of the Nested Named Entity Recognition method based on part-of-speech awareness of the present disclosure, the PANNER model corresponding to the above method was trained and optimized using the negative log-likelihood function and stochastic gradient descent method on the obtained English text corpus. Then the recognition of nested named entities was verified based on the GENIA dataset, and the comparison of the recognition results with other different models was carried out separately for the present application PANNER model on different entity layers. The PANNER model on different lexical-centered pre-defined lexical paths, and the obtained results are shown in Tables 4-6, respectively, from the given precision, recall and F1 score. It can be seen that the Nested Named Entity Recognition method based on part-of-speech awareness of the present disclosure applied to the GENIA dataset corresponds to a comprehensive effect than that of similar named body recognition models. In addition, the runtime performance and time consumption of the null random wandering algorithm and the whole nested named entity recognition model PANNER with neighbor node sampling of the present disclosure were also verified, and the results are shown in FIGS. 7-9, which further verifying that the Nested Named Entity Recognition method based on part-of-speech awareness of the present disclosure has a high accuracy based on the learning efficiency and runtime performance of the model compared with the existing models.

TABLE 4

| comparison of experimental results based on GENIA dataset | | | | | | | | | |
|---|---|---|---|---|---|---|---|---|---|
| Model | HMM | CRF | LSTM | LSTM-CRF | BENSC | Hypergraph | CGN | HAN | PANNER |
| Precision (%) | 82.15 | 86.13 | 84.25 | 82.46 | 78.9 | 74.42 | 82.18 | 85.18 | 84.18 |
| Recall (%) | 56.73 | 58.39 | 64.29 | 65.39 | 72.7 | 67.58 | 67.81 | 70.53 | 73.98 |
| F1-score (%) | 67.74 | 69.60 | 72.93 | 72.94 | 75.67 | 70.84 | 74.31 | 77.17 | 78.75 |

TABLE 5 performance of PANNER model based on GENIA dataset on different entity layers

| Layers | 1 | 2 | 3 | 4 | ALL Layers |
|---|---|---|---|---|---|
| Precision (%) | 84.13 | 84.91 | 84.37 | 82.46 | 84.18 |
| Recall (%) | 72.23 | 76.87 | 73.18 | 68.39 | 73.98 |
| F1-score (%) | 78.30 | 80.69 | 78.38 | 74.77 | 78.75 |

TABLE 6 comparison results of the PANNER model on preset part-of-speech paths centered on different parts of speech

| Node | Metrics | | | |
| | Verbs | Modify | Relations | Nouns |
|---|---|---|---|---|
| node id | 2 | 3 | 4 | 1 |
| Paths | 1-2, 3-2, 4-2, 4-3 | 1-2, 3-2, 4-2, 4-3 | 4-1, 4-2, 4-3, 2-3 | 2-1, 3-1, 4-1, 3-2 |
| Precision (%) | 81.32 | 76.92 | 78.28 | 84.18 |
| Recall (%) | 73.83 | 69.47 | 66.35 | 73.98 |
| F1-Score (%) | 77.39 | 73.01 | 71.82 | 78.75 |

It should be noted that although the steps in the above flowchart are shown sequentially as indicated by the arrows, these steps are not necessarily executed sequentially in the order indicated by the arrows. Except as expressly stated herein, there is no strict order in which these steps are performed, and they may be performed in other orders.

Figure 10:
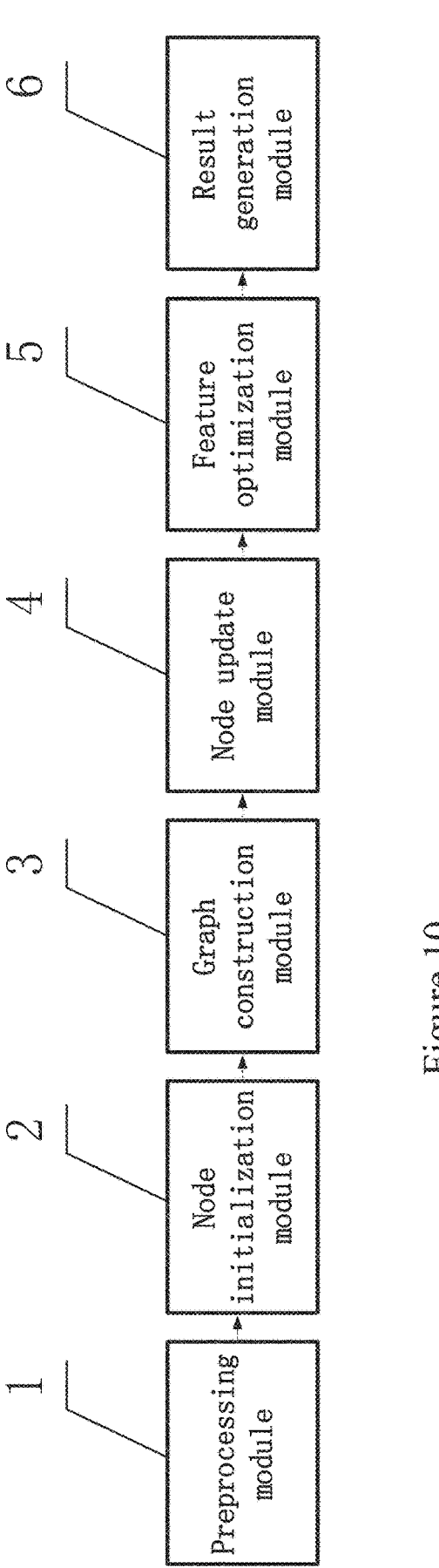
FIG. 10 is a schematic diagram of the structure of Nested Named Entity Recognition system based on part-of-speech awareness in an embodiment of the present disclosure.

In one embodiment, as shown in FIG. 10, a Nested Named Entity Recognition system based on part-of-speech awareness is provided, comprising:

a preprocessing module 1, which is used for obtaining text word data of text to be recognized, wherein the text word data includes text sequence ID, part of speech category, word frequency and word vector representation;

a node initialization module 2, which is used for performing feature extraction on the text word data by using a BiLSTM model to obtain a corresponding text word depth feature, and initializing each text word of the text to be recognized into a corresponding graph node according to the text word depth feature;

a graph construction module 3, which is used for constructing a text heterogeneous graph of the text to be recognized based on a transfer relationship between the graph nodes;

a node update module 4, which is used for updating the text word depth feature of the graph node in the text heterogeneous graph via an attention mechanism based on the text heterogeneous graph and a preset part-of-speech path;

a feature optimization module 5, which is used for performing feature extraction on all graph nodes of the updated text heterogeneous graph by using the BiLSTM model, to obtain text word vector representation to be decoded; and a result generation module 6, which is used for decoding and annotating the text word vector representation to be decoded, to obtain a nested named entity recognition result.

The specific limitations of a Nested Named Entity Recognition system based on part-of-speech awareness can be found in the limitations of a Nested Named Entity Recognition method based on part-of-speech awareness above and will not be repeated herein. The modules of the Nested Named Entity Recognition system based on part-of-speech awareness the above may be implemented in whole or in part by software, hardware, and combinations thereof. Each of the above modules may be embedded in hardware or independent of the processor in the computer device, or may be stored in memory in the electronic device in software form so that the processor can be called to perform the operations corresponding to each of the above modules.

Figure 11:
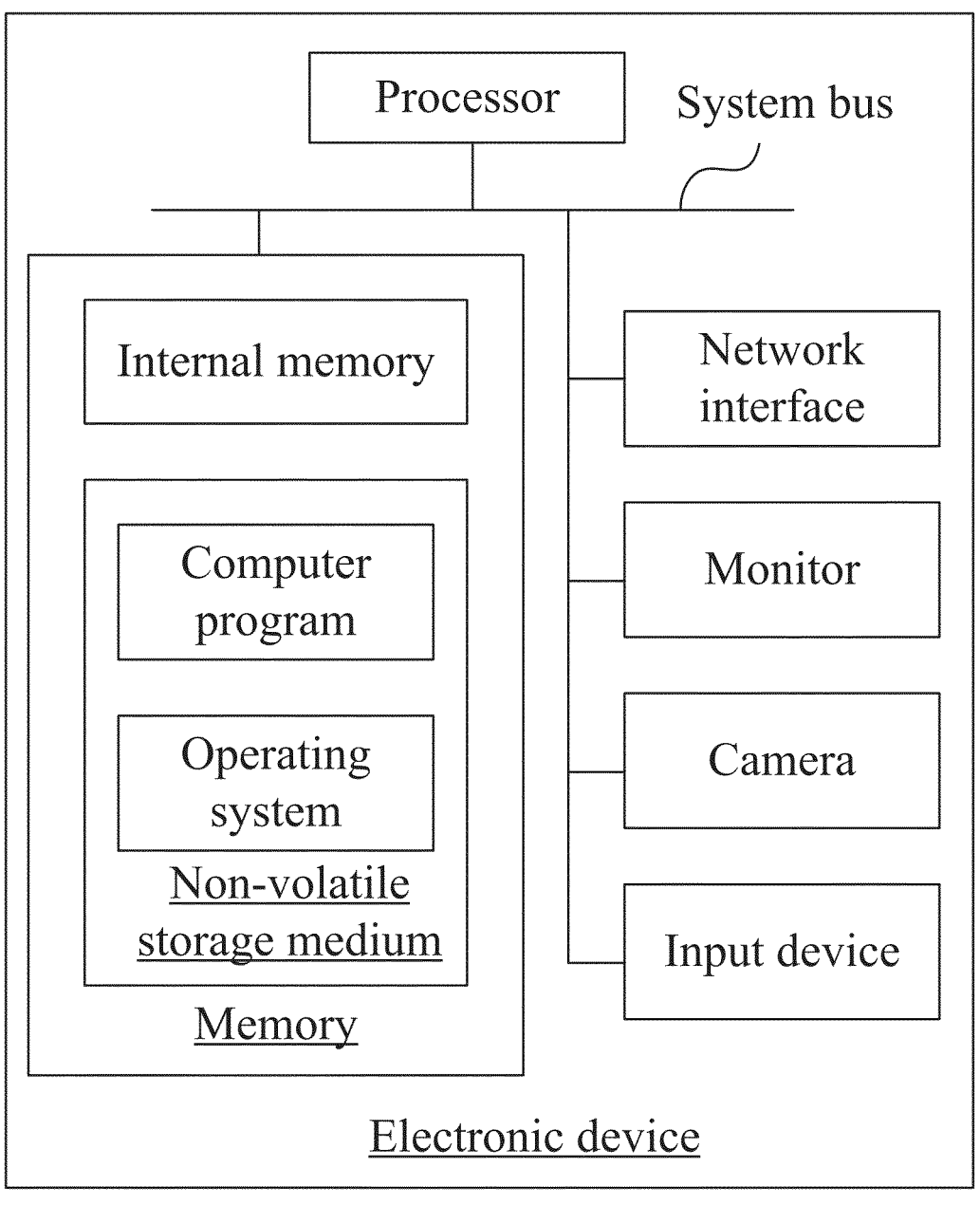
FIG. 11 is an internal structure diagram of an electronic device in an embodiment of the present disclosure.

FIG. 11 illustrates an internal structure diagram of an electronic device in an embodiment, which may specifically be a terminal or a server. As shown in FIG. 11, the electronic device includes a processor connected via a system bus, a memory, a network interface, a display, and an input device. In particular, the processor of the electronic device is used to provide computing and control capabilities. The memory of the computer apparatus includes a non-volatile storage medium, an internal memory. The non-volatile storage medium stores an operating system and a computer program. The internal memory provides an environment for the operation of the operating system and the computer program in the non-volatile storage medium. The network interface of the electronic device is used to communicate with an external terminal via a network connection. The computer program is executed by the processor to implement a Nested Named Entity Recognition method based on part-of-speech awareness. The display of the electronic device may be a liquid crystal display or an electronic ink display, and the input device of the electronic device may be a touch layer overlaying the display, or a key, trackball, or trackpad provided on the housing of the computer device, or an external keyboard, trackpad, or mouse, etc.

Those of ordinary skill in the art can understand that the structure shown in FIG. 11 is only a block diagram of a partial structure related to the solution of this application, and does not constitute a limitation on the computer equipment on which the solution of this present disclosure is applied, specific electronic devices can include more or fewer components than shown in the figures, or combine certain components, or have the same arrangement of components.

In one embodiment, there is provided an electronic device comprising a memory, a processor and a computer program stored in the memory and runnable on the processor, the processor executing the computer program when implementing the steps of the method described above.

In one embodiment, a computer-readable storage medium is provided, on which a computer program is stored, and when the computer program is executed by a processor, the steps of the above method are implemented.

In summary, the present disclosure provides a Nested Named Entity Recognition method based on part-of-speech awareness, system, device and storage medium therefor, through the method, the BiLSTM model is used to extract the feature of the text word data to obtain the text word depth feature after obtaining the text word data of the text to be recognized, and each text word of the text to be recognized is initialized into the corresponding graph node according to the text word depth feature, and the text heterogeneous composition of the text to be recognized is constructed according to the preset part of speech path, the text word data of the graph nodes is updated by the attention mechanism, and then the BiLSTM model is used to extract the features of all graph nodes of the text heterogeneous graph, and after obtaining the word vector representation of the text to be decoded, the conditional random field is used for decoding and annotation, and the nested named entity recognition result is obtained. Compared with the current technology, the Nested Named Entity Recognition method based on part-of-speech awareness uses heterogeneous representation learning for nested entity recognition, introduces part-of-speech knowledge to initialize text features, and combines with a part-of-speech path-based empty random walk algorithm designed to obtain more neighbor node information by sampling, the ordinary entities and nested entities are effectively recognized and processed through heterogeneous graph based on the Deep Graph Library framework, which improves the accuracy and learning efficiency of Nested Named Entity Recognition and further improves the performance and advantages of Nested Named Entity Recognition model.

Each embodiment in this specification is described in a progressive manner, with each embodiment being directly identical or similar to each other, with each embodiment focusing on what is different from the other embodiments. In particular, for the system embodiment, since it is basically similar to the method embodiment, the description is relatively simple, and the relevant parts can be found in the method embodiment. It should be noted that the technical features of the above embodiments can be combined in any way. For the sake of brevity, not all possible combinations of the technical features of the above embodiments have been described, however, as long as the combinations of these technical features are not contradictory, they should be considered to be within the scope of this specification.

The above described embodiments express only several preferred embodiments of the present application, and their descriptions are more specific and detailed, but they should not be construed as a limitation of the scope of the patent of the present disclosure. It should be noted that for a person of ordinary skill in the art, several improvements and substitutions can be made without departing from the technical principles of the present disclosure, and these improvements and substitutions shall also be regarded as the scope of protection of the present application. Therefore, the scope of protection of the patent of this application shall be subject to the scope of protection of the claims.

The invention claimed is:

1. A Nested Named Entity Recognition method based on part-of-speech awareness, comprising:

obtaining text word data of text to be recognized, wherein the text word data includes text sequence ID, part of speech category, word frequency and word vector representation;

performing feature extraction on the text word data by using a bidirectional long short-term memory (BiLSTM) model to obtain a corresponding text word depth feature, and initializing each text word of the text to be recognized into a corresponding graph node according to the text word depth feature; wherein the BiLSTM model is a bidirectional long short-term memory (LSTM) network encoder;

constructing a text heterogeneous graph of the text to be recognized based on a transfer relationship between the graph nodes;

updating the text word depth feature of the graph node in the text heterogeneous graph via an attention mechanism based on the text heterogeneous graph and a preset part-of-speech path;

performing feature extraction on all graph nodes of the updated text heterogeneous graph by using the BiLSTM model, to obtain text word vector representation to be decoded; and decoding and annotating the text word vector representation to be decoded, to obtain a nested named entity recognition result;

wherein the step of decoding and annotating the text word vector representation to be decoded, to obtain a nested named entity recognition result comprises:

decoding and annotating the text word vector representation to be decoded using a conditional random field to obtain a named entity identification result and corresponding first annotated text word vector representation;

employing an improved LSTM unit to perform boundary detection on the first annotated text word vector representation to determine whether there are entity boundary words in the first annotated text word vector representation, wherein the improved LSTM unit is obtained by adding a multilayer perceptron (MLP) to an output hidden layer of the LSTM unit; wherein the multilayer perceptron MLP comprises two nonlinear activation layers and a fully connected layer classifier;

if entity boundary words exist in the first annotated text word vector representation, merging the first annotated text word vector representation between adjacent two of the entity boundary words to obtain second annotated text word vector representation, and performing decoding, annotation, and boundary detection on the second annotated text word vector representation to start a next round of entity recognition iteration, and vice versa, stopping a current iteration and using the named entity recognition result as a forward named entity recognition result;

reverse filling according to the text word vector representation corresponding to the forward entity recognition result to obtain third annotated text word vector representation, and merging the third annotated text word vector representation with text word vector representation corresponding to a previous round of entity recognition iteration to obtain fourth annotated text word vector representation; and decoding and annotating the fourth annotated text word vector representation using conditional random fields to obtain the nested named entity recognition result.

2. The Nested Named Entity Recognition method based on part-of-speech awareness according to claim 1, wherein the step of obtaining text word data of text to be recognized specifically comprises:

setting a corresponding text sequence ID to each text word in an order of a position of each text word in the text to be recognized;

performing lexical annotation on the text to be recognized, and performing lexical classification and word frequency statistics on each text word in the text to be recognized based on a lexical annotation result to obtain a corresponding speech category and word frequency; and generating word vector representation of each text word in the text to be recognized by using a Bidirectional Encoder Representations from Transformers (BERT) model.

3. The Nested Named Entity Recognition method based on part-of-speech awareness according to claim 1, wherein the step of performing feature extraction on the text word data by using a BiLSTM model to obtain a corresponding text word depth feature specifically comprises:

concatenating and integrating the text sequence ID, the part of speech, the word frequency and the word vector representation of the text word data to obtain a text word initial feature; and performing feature extraction on the text word initial feature by using the BiLSTM model, to obtain the text word depth feature, wherein the text word depth feature is expressed as follows:

$$h(x_i)=\text{BiLSTM}(F(x_{i)}) \tag{1}$$

wherein in the $$F(x_i) = \left[x_i^{id}, x_i^{cat}, x_i^{freq}, x_i^{nembed}\right], xi, F(x_i) \text{ and } h(xi), \quad \text{formula (1)}$$

represent text word data, text word initial feature and text word depth feature of an i-th text word, respectively, $$x_i^{freq} \text{ and } x_i^{nembed}$$

represent text sequence ID, part of speech category, word frequency and word vector representation of i-th text word data.

4. The Nested Named Entity Recognition method based on part-of-speech awareness according to claim 1, wherein the text heterogeneous graph of the text to be recognized is expressed as follows:

$$G=(V, E, Ov, Path) \tag{2}$$

wherein in the formula (2), V represents a node set composed of different part-of-speech text words, and a value of each node is the text word depth feature, E represents a set of edges composed of nodes, Ov represents a set of part-of-speech types of nodes, Path represents the preset part-of-speech path, which includes a verb and noun path, a noun modifiers and noun path, a connectives and noun path, and a verb modifiers and verb paths.

5. The Nested Named Entity Recognition method based on part-of-speech awareness according to claim 1, wherein the step of updating the text word depth feature of the graph node in the text heterogeneous graph via an attention mechanism based on the text heterogeneous graph and a preset part-of-speech path specifically comprises:

performing a depth-first traversal of the text heterogeneous graph according to each preset part-of-speech path to obtain a corresponding graph node sequence;

sampling a neighbor node of each graph node in each preset part-of-speech path according to the graph node sequence to obtain a corresponding neighbor node set;

integrating node information of the neighbor node set of each graph node in each preset part-of-speech path by means of the attention mechanism to obtain corresponding graph node representation, wherein the graph node representation is expressed as follows:

$$node_v^{att_k} = \sum_{N_j^{Path_i} \in N_v^{Path_i}} a_j^k N_j^{Path_i} \tag{3}$$

wherein in the formula (3), $$N_v^{Path_i} = \text{DilatedRandomWalk}(v)$$

$$a_j^k = \frac{\exp\left(LeakyReLU\left(u^T N_j^{Path_i}\right)\right)}{\sum_{N_j^{Path_i} \in N_v^{Path}} \exp\left(LeakyReLU\left(u^T N_j^{Path_i}\right)\right)} N_j^{Path_i},$$

graph node v represents a graph node in an ith preset part-of-speech path $Path_i$, and is valued as a corresponding text word depth feature, $$N_v^{Path_i}$$

represents a neighbor node set corresponding to a graph node in the i-th preset part-of-speech path $Path_i$, $$N_j^{Path_i}$$

represents j-th neighbor node of the graph node v in the i-th part-of-speech path $Path_i$, k represents a number of attention heads in the attention mechanism, $$a_j^k$$

represents a weight coefficient of the j-th neighbor node of the graph node v in the i-th part-of-speech path $Path_i$, $$node_v^{att_k}$$

represents graph node representation of the graph node v calculated by means of attention of k attention heads, exp(·) represents an exponential function with base e, LeakyReLU (·) represents the activation function, $u^T$ represents an edge weight matrix; and updating the word frequency and word the vector representation of the corresponding graph node in the text heterogeneous graph according to the graph node representation.

6. The Nested Named Entity Recognition method based on part-of-speech awareness according to claim 5, wherein the step of sampling a neighbor node of each graph node in each preset part-of-speech path according to the graph node sequence to obtain a corresponding neighbor node set specifically comprises:

obtaining a number of nodes in each preset part-of-speech path, and determining a base sampling interval based on the number of nodes; and randomly obtaining a plurality of neighbor nodes corresponding to each graph node in the preset part-of-speech path in the graph node sequence according to a preset sampling probability and a sampling stopping condition by using an integer multiple of the base sampling interval as a moving step, to obtain the corresponding neighbor node set, wherein the sampling stopping condition is that a total number of neighbor nodes obtained by sampling meets a preset number requirement and a number of nodes corresponding to each part of speech category in the neighbor nodes meets a preset proportion requirement.

7. An electronic device, comprising a memory, a processor, and a computer program stored in the memory and executable on the processor, wherein the processor performs steps of the Nested Named Entity Recognition method based on part-of-speech awareness according to claim 1 when executing the computer program.

8. The electronic device according to claim 7, wherein the step of obtaining text word data of text to be recognized specifically comprises:

setting a corresponding text sequence ID to each text word in an order of a position of each text word in the text to be recognized;

performing lexical annotation on the text to be recognized, and performing lexical classification and word frequency statistics on each text word in the text to be recognized based on a lexical annotation result to obtain a corresponding speech category and word frequency; and generating word vector representation of each text word in the text to be recognized by using the BERT model.

9. The electronic device according to claim 7, wherein the step of performing feature extraction on the text word data by using a BiLSTM model to obtain a corresponding text word depth feature specifically comprises:

concatenating and integrating the text sequence ID, the part of speech, the word frequency and the word vector representation of the text word data to obtain a text word initial feature; and performing feature extraction on the text word initial feature by using the BiLSTM model, to obtain the text word depth feature, wherein the text word depth feature is expressed as follows:

$$h(x_i)=BiLSTM(F(x_i)) \tag{4},$$

wherein in the $$F(x_i) = \left[x_i^{id}, x_i^{cat}, x_i^{freq}, x_i^{nembed}\right], \; xi, \; F(x_i) \; \text{and} \; h(xi), \qquad \text{formula (4)}$$

represent text word data, text word initial feature and text word depth feature of an i-th text word, respectively, $$x_i^{id}, x_i^{cat}, x_i^{freq} \; \text{and} \; x_i^{nembed}$$

represent text sequence ID, part of speech category, word frequency and word vector representation of i-th text word data.

10. The electronic device according to claim 7, wherein the text heterogeneous graph of the text to be recognized is expressed as follows:

$$G=(V, E, Ov, Path) \tag{5}$$

wherein in the formula (5), V represents a node set composed of different part-of-speech text words, and a value of each node is the text word depth feature, E represents a set of edges composed of nodes, Ov represents a set of part-of-speech types of nodes, Path represents the preset part-of-speech path, which includes a verb and noun path, a noun modifiers and noun path, a connectives and noun path, and a verb modifiers and verb paths.

11. The electronic device according to claim 7, wherein the step of updating the text word depth feature of the graph node in the text heterogeneous graph via an attention mechanism based on the text heterogeneous graph and a preset part-of-speech path specifically comprises:

performing a depth-first traversal of the text heterogeneous graph according to each preset part-of-speech path to obtain a corresponding graph node sequence;

sampling a neighbor node of each graph node in each preset part-of-speech path according to the graph node sequence to obtain a corresponding neighbor node set;

integrating node information of the neighbor node set of each graph node in each preset part-of-speech path by means of the attention mechanism to obtain corresponding graph node representation, wherein the graph node representation is expressed as follows:

$$node_v^{att_k} = \sum\nolimits_{N_j^{Path_i} \in N_v^{Path_i}} a_j^k N_j^{Path_i} \tag{6}$$

wherein in the $$a_j^k = \frac{\exp\left(LeakyReLU\left(u^T N_j^{Path_i}\right)\right)}{\sum\nolimits_{N_j^{Path_i} \in N_v^{Path}} \exp\left(LeakyReLU\left(u^T N_j^{Path_i}\right)\right)} N_j^{Path_i},$$

$$N_v^{Path_i} = DilatedRandomWalk(v), \qquad \text{formula (6)}$$

graph node v represents a graph node in an ith preset part-of-speech path Path$_i$, and is valued as a corresponding text word depth feature, $$N_v^{Path_i}$$

represents a neighbor node set corresponding to a graph node in the i-th preset part-of-speech path Path$_i$, $$N_j^{Path_i}$$

represents a j-th neighbor node of the graph node v in the i-th part-of-speech path Path$_j$, k represents a number of attention heads in the attention mechanism, $$a_j^k$$

represents a weight coefficient of the j-th neighbor node of the graph node v in the i-th part-of-speech path Path$_i$, $$node_v^{att_k}$$

represents graph node representation of the graph node v calculated by means of attention of k attention heads, exp(·) represents an exponential function with base e, LeakyReLU (·) represents the activation function, $u^T$ represents an edge weight matrix; and updating the word frequency and word the vector representation of the corresponding graph node in the text heterogeneous graph according to the graph node representation.

12. The electronic device according to claim 11, wherein the step of sampling a neighbor node of each graph node in each preset part-of-speech path according to the graph node sequence to obtain a corresponding neighbor node set specifically comprises:

obtaining a number of nodes in each preset part-of-speech path, and determining a base sampling interval based on the number of nodes; and randomly obtaining a plurality of neighbor nodes corresponding to each graph node in the preset part-of-speech path in the graph node sequence according to a preset sampling probability and a sampling stopping condition by using an integer multiple of the base sampling interval as a moving step, to obtain the corresponding neighbor node set, wherein the sampling stopping condition is that a total number of neighbor nodes obtained by sampling meets a preset number requirement and a number of nodes corresponding to each part of speech category in the neighbor nodes meets a preset proportion requirement.

13. A non-transitory computer-readable storage medium, storing a computer instruction, wherein a processor performs steps of the Nested Named Entity Recognition method based on part-of-speech awareness according to claim 1 when executing the computer instruction.

14. The non-transitory computer-readable storage medium according to claim 13, wherein the step of obtaining text word data of text to be recognized specifically comprises:

setting a corresponding text sequence ID to each text word in an order of a position of each text word in the text to be recognized;

performing lexical annotation on the text to be recognized, and performing lexical classification and word frequency statistics on each text word in the text to be recognized based on a lexical annotation result to obtain a corresponding speech category and word frequency; and generating word vector representation of each text word in the text to be recognized by using the BERT model.

15. The non-transitory computer-readable storage medium according to claim 13, wherein the step of performing feature extraction on the text word data by using a BiLSTM model to obtain a corresponding text word depth feature specifically comprises:

concatenating and integrating the text sequence ID, the part of speech, the word frequency and the word vector representation of the text word data to obtain a text word initial feature; and performing feature extraction on the text word initial feature by using the BiLSTM model, to obtain the text word depth feature, wherein the text word depth feature is expressed as follows:

$$h(x_i)=BiLSTM(F(x_i)) \tag{7}$$

wherein in the formula (7), $$F(x_i) = \left[x_i^{id}, x_i^{cat}, x_i^{freq}, x_i^{nembed}\right], xi, F(x_i) \text{ and } h(xi)$$

represent text word data, text word initial feature and text word depth feature of an i-th text word, respectively, $$x_i^{id}, x_i^{cat}, x_i^{freq} \text{ and } x_i^{nembed}$$

represent text sequence ID, part of speech category, word frequency and word vector representation of i-th text word data.

16. The non-transitory computer-readable storage medium according to claim 13, wherein the text heterogeneous graph is expressed as follows:

$$G=(V, E, Ov, Path) \tag{8}$$

wherein in the formula (8), V represents a node set composed of different part-of-speech text words, and a value of each node is the text word depth feature, E represents a set of edges composed of nodes, Ov represents a set of part-of-speech types of nodes, Path represents the preset part-of-speech path, which includes a verb and noun path, a noun modifiers and noun path, a connectives and noun path, and a verb modifiers and verb paths.

17. The non-transitory computer-readable storage medium according to claim 13, wherein the step of updating the text word depth feature of the graph node in the text heterogeneous graph via an attention mechanism based on the text heterogeneous graph and a preset part-of-speech path specifically comprises:

performing a depth-first traversal of the text heterogeneous graph according to each preset part-of-speech path to obtain a corresponding graph node sequence;

sampling a neighbor node of each graph node in each preset part-of-speech path according to the graph node sequence to obtain a corresponding neighbor node set;

integrating node information of the neighbor node set of each graph node in each preset part-of-speech path by means of the attention mechanism to obtain corresponding graph node representation, wherein the graph node representation is expressed as follows:

$$node_v^{att_k} = \sum_{N_j^{Path_i} \in N_v^{Path_i}} a_j^k N_j^{Path_i} \tag{9}$$

wherein in the $$N_v^{Path_i} = DilatedRandomWalk(v), \quad \text{formula (9)}$$

$$a_j^k = \frac{\exp\left(LeakyReLU\left(u^T N_j^{Path_i}\right)\right)}{\sum_{N_j^{Path_i} \in N_v^{Path}} \exp\left(LeakyReLU\left(u^T N_j^{Path_i}\right)\right)} N_j^{Path_i},$$

graph node v represents a graph node in an ith, preset part-of-speech path Path_i, and is valued as a corresponding text word depth feature, $$N_v^{Path_i}$$

represents a neighbor node set corresponding to a graph node in the i-th preset part-of-speech path Path_i, $$N_j^{Path_i}$$

represents a j-th neighbor node of the graph node v in the i-th part-of-speech path $Path_i$, k represents a number of attention heads in the attention mechanism, $$a_j^k$$

represents a weight coefficient of the j-th neighbor node of the graph node v in the i-th part-of-speech path $Path_i$, $$node_v^{att_k}$$

represents graph node representation of the graph node v calculated by means of attention of k attention heads, $\exp(\cdot)$ represents an exponential function with base e, LeakyReLU $(\cdot)$ represents the activation function, $u^T$ represents an edge weight matrix; and updating the word frequency and word the vector representation of the corresponding graph node in the text heterogeneous graph according to the graph node representation.

\* \* \* \* \*